(12) United States Patent
Hanson et al.

(10) Patent No.: US 12,537,915 B2
(45) Date of Patent: Jan. 27, 2026

(54) IN-VEHICLE CONFERENCING WITH USER TRACKING AND SPEAKER PRIORITIZATION

(71) Applicant: Ford Global Technologies, LLC, Dearborn, MI (US)

(72) Inventors: Ryan Edwin Hanson, Livonia, MI (US); Christopher Robert Van Wiemeersch, Novi, MI (US); John Robert Van Wiemeersch, Novi, MI (US); Thomas Joseph Hermann, Troy, MI (US)

(*) Notice: Subject to any disclaimer, the term of this patent is extended or adjusted under 35 U.S.C. 154(b) by 315 days.

(21) Appl. No.: 18/330,158

(22) Filed: Jun. 6, 2023

(65) Prior Publication Data

US 2024/0414284 A1    Dec. 12, 2024

(51) Int. Cl.
*H04N 7/15* (2006.01)
*G06V 10/25* (2022.01)
*G06V 10/26* (2022.01)
*G06V 20/59* (2022.01)

(52) U.S. Cl.
CPC ............ *H04N 7/157* (2013.01); *G06V 10/25* (2022.01); *G06V 10/26* (2022.01); *G06V 20/59* (2022.01)

(58) Field of Classification Search
CPC ......... H04N 7/157; G06V 20/59; G06V 10/25
USPC ...................................................... 348/14.08
See application file for complete search history.

(56) References Cited

U.S. PATENT DOCUMENTS

| | | | |
|---|---|---|---|
| 9,293,151 B2 | 3/2016 | Herbig et al. | |
| 9,443,510 B2 | 9/2016 | Jung | |
| 9,620,146 B2 | 4/2017 | Buck et al. | |
| 10,291,996 B1* | 5/2019 | Shaffer | B60N 2/002 |
| 2009/0088215 A1* | 4/2009 | Caspi | G06F 21/32 455/563 |
| 2021/0051298 A1* | 2/2021 | Atkins | H04N 7/147 |

OTHER PUBLICATIONS

Astik Biswas et al., Multiple Cameras Audio Visual Speech Recognition Using Active Appearance Model Visual Features in Car Environment, Jan. 23, 2016.
Liopa Ltd, In-Vehicle Voice Activation—Room for Improvement?, pp. 1-3.

* cited by examiner

*Primary Examiner* — Amal S Zenati
(74) *Attorney, Agent, or Firm* — Frank Lollo; Eversheds Sutherland (US) LLP

(57) ABSTRACT

Systems and methods for implementing smart in-vehicle conferencing with user tracking and speaker prioritization. A controller system of a vehicle may determine, based at least in part on one or more cameras, a plurality of candidate best image sources, determine, from the plurality of candidate best image sources, a best image source for a speaker in the vehicle, determine, based at least in part on the best image source, a video feed, determine, based at least in part on one or more microphones, a plurality of candidate best audio sources, determine, from the plurality of candidate best audio sources, a best audio source for the speaker, determine, based at least in part on the best audio source, an audio feed, and provide, to a conference call line, the video feed and the audio feed.

20 Claims, 5 Drawing Sheets

IN-VEHICLE CONFERENCING WITH USER TRACKING AND SPEAKER PRIORITIZATION

BACKGROUND

There are many challenges related to providing digital meeting solutions in a vehicle. For example, typical in-vehicle vehicle conferencing systems may have only one camera to serve multiple occupants that are located throughout the cabin of the vehicle. Further, there may be difficulties in being able to determine who is speaking, which can be compounded by the video feed for certain occupants being obstructed by physical features of the vehicle, such as headrests or other items in the vehicle cabin. Additionally, microphones situated in the front of the vehicle may provide reduced functionality for occupants in the rear of the vehicle, especially for larger vehicles with two or three rows of seating. Conversely, attempting to use multiple microphones may increase noise levels for participants.

BRIEF DESCRIPTION OF THE DRAWINGS

A detailed description is set forth regarding the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
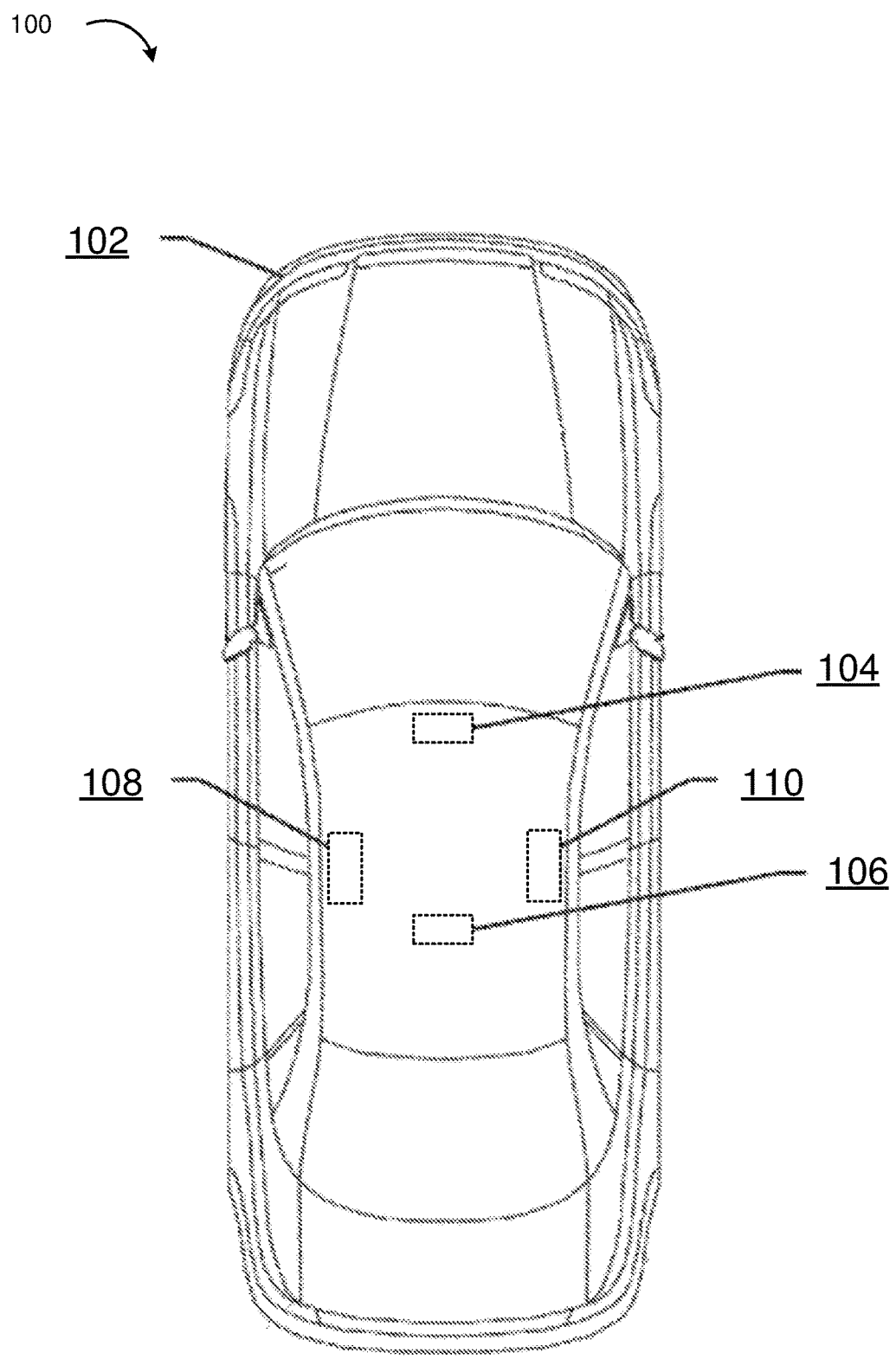
FIG. 1 illustrates a diagram depicting an example of smart in-vehicle conferencing with user tracking and speaker prioritization, according to at least one embodiment of the present disclosure.

The present disclosure is directed to systems and methods for smart in-vehicle conferencing with user tracking and speaker prioritization. Techniques described herein may be utilized to allow for intelligent prioritization and processing of video and/or audio feed information, which can be used in the context of digital meeting software and solutions. Techniques described herein should only be implement in accordance with the owner manual and safety guidelines. The driver of a vehicle should only participate in conferencing if the vehicle is in autonomous mode or stopped.

Providing digital or virtual meeting solutions in the context of a vehicle presents unique challenges. While a laptop or tablet may provide for a front-facing camera that is ideally situated for capturing video and/or audio from a meeting participant, a vehicle may have only a single camera to service multiple occupants of a vehicle. A typical in-vehicle video conferencing system may provide an aggregated video and audio output for all participants of the vehicle. For example, a camera may be located in a central dashboard or near the front of the vehicle. The aggregated feed may be provided for all vehicle riders within the camera's field of view, as well as capture sound from within the vehicle cabin. That is, a single video and audio collector is used for a group of individuals in the vehicle to be presented as a single participant of a video conferencing platform or software.

As described above, one of the challenges to address involves the difficulty in determining who is speaking within the cabin of a vehicle. Consider a hypothetical example in which multiple occupants of a vehicle are using a single camera for a video conference—when viewed by other participants of the video conference, the vehicle's video feed may be presented using a wide view lens that is suitable for capturing all of the vehicle's occupants but may fall short by providing inadequate image size for the other participants of the video conference to determine who in the vehicle is speaking and to see their facial expressions.

Additionally, video camera placement in the cabin of a vehicle may be limited or constrained. For most vehicles, when a single camera is used, it may be situated in a manner where some occupants are obstructed. While the view of front row passengers may be best, passengers in a second or even third row may be possibly obstructed by head rests or other items in the vehicle.

Furthermore, when a microphone in the front of the vehicle is used to capture audio signals, the audio may be poor for speakers that are farthest from the microphone, and noise captured from other microphones could overpower the sound detected for speech of someone that is further away. If multiple microphones are used, that may increase the noise level of participants because the aggregated audio from multiple microphones around the vehicle's cabin may generate a noisy audio due to pick-up of unwanted sound, making it difficult to understand the speech of the person that is actually speaking.

Some or all of the challenges described above may be solved using techniques for smart in-vehicle conferencing with user tracking and speaker prioritization. As described in greater detail below, various embodiments of the present disclosure may be utilized to implement techniques for smart in-vehicle conferencing with user tracking and speaker prioritization. In at least one embodiment, a vehicle, comprises a vehicle controller system with electronic circuitry. The electronic circuitry may include one or more processors (e.g., processing units) and memory that stores executable instructions such that the executable instructions, when executed by the one or more processors, implement various techniques described herein. In various embodiments, the vehicle has a controller system that performs localization of an occupant of the vehicle speaking through the use of various sensors in the vehicle, such as cameras and/or microphones to capture visual and/or audio data to identify a speaker in the vehicle. The controller system may identify a speaker by detection of mouth movement, audio signal strength, audio signal arrival time (indicating distance of sound traveled), assessment of hand movement, or combinations thereof.

In at least one embodiment, a vehicle, comprises one or more cameras, one or more microphones, and a controller system, further comprising one or more processors and memory storing executable instructions that, as a result of execution by the one or more processors, causes the controller system to implement various techniques described herein below in greater detail. These techniques having the controller system of the vehicle determine, based at least in part on the one or more cameras, a plurality of candidate best image sources, determine, from the plurality of candidate best image sources, a best image source for a speaker in the vehicle, determine, based at least in part on the best image source, a video feed, determine, based at least in part on the one or more microphones, a plurality of candidate best audio sources, determine, from the plurality of candidate best audio sources, a best audio source for the speaker, determine, based at least in part on the best audio source, an audio feed, and provide, to a conference call line, the video feed and the audio feed.

In various embodiments, the controller system of the vehicle is further configured to process the best image source to produce the video feed, wherein the best image source is processed by at least: performing localization of a speaker in the vehicle, determining a region of one or more images of the best image source that is associated with the speaker, and cropping the best image source to remove one or more other occupants of the vehicle from the video feed.

In various embodiments, the localization of the speaker is based at least in part on audio information collected by the one or more microphones to determine where the speaker is. For example, microphones located throughout the cabin of the vehicle may be used to triangulate the location of the speaker based on the speech. In various embodiments, the controller system of the vehicle is configured to determine that the speaker is obstructed from view of the one or more cameras; and select, as the best image source, a virtual avatar for the speaker.

In various embodiments, the controller system of the vehicle is configured to determine an identity of the speaker, determine a display name based on the identity, and provide, to the conference call line, the display name. For example, when the vehicle connects to the conference call, it may have a display name that identifies the participant as "Joe's sedan", which will be sent to and seen as the display name by the remote participants on the call. Continuing with this example, when a first occupant of the car begins speaking, the name of the speaker may be identified (e.g., using voice recognition technology) and used to update the display name. An updated display name may be sent to the remote participants and they may see additional information regarding the speaker as the display name, for example: "Joe's sedan (Kelly speaking)". If another occupant of the vehicle then speaks, the display name may change to the other speaker's name, for example: "Joe's sedan (Lance speaking) ".

In various embodiments, the controller system of the vehicle is configured to determine a second speaker, determine, from the plurality of candidate best image sources, a second best image source for the second speaker, wherein the second best image source is different from the best image source, and use the second best image source in place of the best image source for the video feed.

In various embodiments, the plurality of candidate best audio sources comprises one or more external devices in the vehicle that is connected to the controller system.

In various embodiments, the best image of the identified speaker is selected or cropped and the audio from the speaker's location will be enhanced or isolated. These enhancements may include, but are not limited to, post processing of video, cropping, stitching, or substituting an archived image of the known speaker as well as post processing of the audio to isolate, amplify, balance, bandpass filter, or noise cancel the audio of background noise, thereby providing an improved user experience for all participants of a video conference.

The vehicle's controller system may act as a multiplexer that selects from among multiple possible audio and/or video feeds from the vehicle that are to be provided for a video conference. In various embodiments, the controller system of the vehicle is configured to select the best image and best audio of the vehicle. The best image may be selected from the closest camera or a cropped view or an archived view of the speaker. The best audio may be selected from the nearest microphone or a processed/filtered audio of the available microphone audio. These best video and best audio signals will be injected into the single conference call line and, as different participants in the cabin speak, the best video and best audio of the person speaking may be isolated and injected into the call line. Thus, from a technical viewpoint, a single, contiguous video/audio feed is provided for a conference call, which is stitched together from multiple image and/or audio sources by the vehicle prior to transmission.

FIG. 1 illustrates a diagram 100 of an example vehicle 102 with multiple vehicle-mounted sensors. In various embodiments, vehicle 102 may include one or more interior cameras 104 and 106, which are positioned to capture images of passengers in the vehicle. For example, camera 104 may be a camera with a wide-angle lens that captures images for occupants in the front row and/or back row of the vehicle. The view of certain occupants may be obstructed by head rests or other physical features of the vehicle. In some embodiments, multiple interior cameras 104, 106 are used to capture images of passengers in all seating positions within the vehicle (e.g., front seats and rear seats) and facing in any direction (e.g., facing forward, rearward, or toward the side of the vehicle). As shown in FIG. 1, vehicle 102 may have cameras 104 and 106, which may be mounted to the vehicle's roof, door, or other vehicle component. Microphones 108 and 110 are positioned such that each microphone can capture audio of vehicle occupants. Microphones may be located throughout the cabin of the vehicle and independently capture audio of speakers.

While FIG. 1 depicts an example configuration of microphones and cameras, it should be viewed merely as an illustrative, non-limiting example of where such audio and image collecting devices may be placed. In various embodiments, each row of the vehicle has a dedicated camera and/or microphone. In some embodiments, each occupant (or only some) has a dedicated camera and/or microphone.

Figure 2:
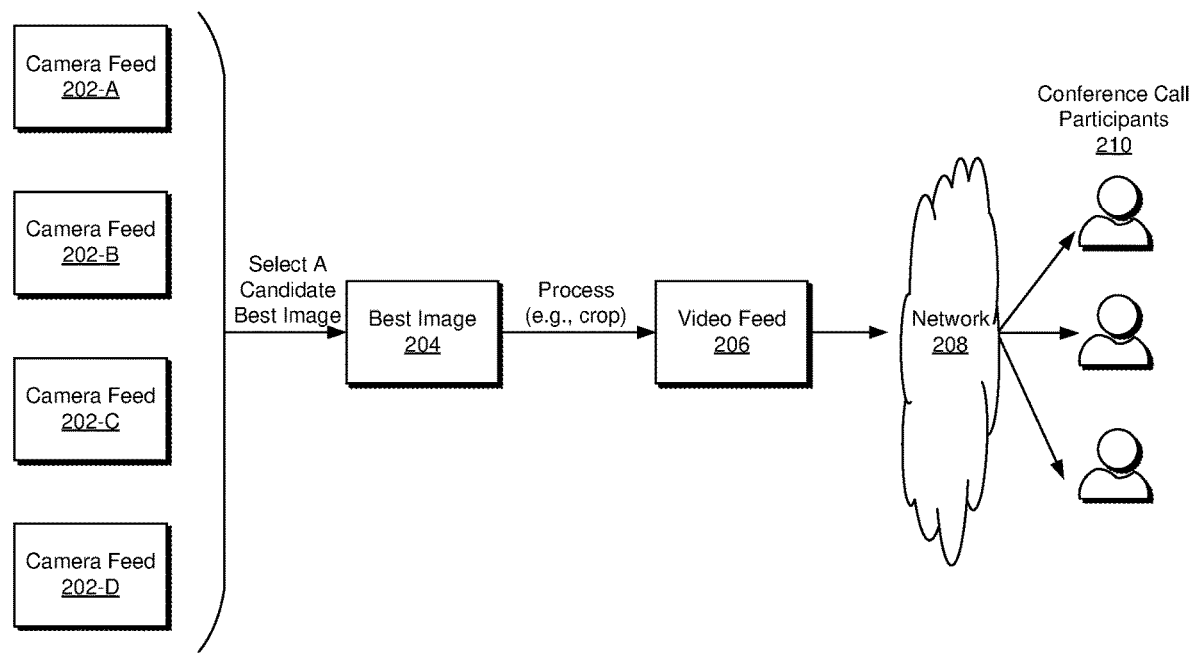
FIG. 2 illustrates a diagram depicting an example of in-vehicle video processing with user tracking and speaker prioritization, according to at least one embodiment of the present disclosure.

FIG. 2 illustrates a diagram 200 depicting an example of in-vehicle video processing with user tracking and speaker prioritization, according to at least one embodiment of the present disclosure.

In at least one embodiment, FIG. 2 is implemented in the context of a vehicle cabin that comprises multiple camera. For example, a first camera may be used to provide camera feed 202-A, a second camera may be used to provide camera feed 202-B, a third camera may be used to provide camera feed 202-C, a fourth camera may be used to provide camera feed 202-D, and so on and so forth. In various embodiments, the camera feeds are candidate sources for best image 204. The candidate sources may include other visual sources, such as a software module that can be used to generate graphics for a virtual avatar.

Best image 204 may be selected from a plurality of candidate best image sources. As discussed above, each camera in a vehicle can serve as a candidate best image source. In some embodiments, the best image 204 is selected based on a ranking of image clarity and the first ranked, second ranked, etc. candidate best image source may be selected, based on various factors such as image quality, bit rate, and so on and so forth.

In various embodiments, best image 204 is selected from the plurality of candidate best image sources (e.g., from one of the camera feeds 202-A thru 202-D or other sources such as a virtual avatar) and is processed. In some embodiments, best image 204 will be selected or cropped. These enhancements may include, but are not limited to, post processing of video, cropping, stitching, or substituting an archived or virtual image of a known speaker thus providing an improved user experience for all participants.

In some embodiments, the best image 204 is selected from a secondary image source and uses a file photo or avatar of an occupant who might be in the outboard seats and not in the view of any of the cameras in the vehicle or may be partially occluded. The conference call (CC) image may be one of a character or cartoon they pick from a roster of pre-recorded image files. In some embodiments, a speaker is occluded but their identity is known, for example, based on the speaker's voice or from prior visual imagery. A virtual avatar—for example, a photorealistic emoji or cartoon character, may be generated based at least in part on the audio to lip-sync the words that are being recorded, rather than providing a partially occluded or low resolution view of the speaker.

In various embodiments, best image 204 is selected based at least in part from audio information. For example, microphones located throughout the cabin may be used to detect the general direction of where a speaker is located. Multiple microphones may detect speech and triangulate the source of the speech and the video may determine a speaker based on where the audio originates from.

In various embodiments, best image 204 is processed to produce video feed 206. In some embodiments, a camera is able to position or zoom in to an identified speaker that can be provided as the best image. However, in some cases, the camera may be in a fixed position and the images captured by the camera may include multiple occupants. The camera feed may be processed to crop to just the face of the person(s) speaking. In some embodiments, in, place of cropping, the full video image is used but occupants not involved in the call, or not speaking, get their face "muted" or blocked via a blur or high pixilation.

In various embodiments, video and/or audio from connected devices in the cabin of the vehicle can be patched in as part of the video feed 206. In various embodiments, video from a smartphone in the cabin could be used as a candidate video source. This external video source may be preferable to using onboard cameras in the case where the speaker is distant from the nearest camera or is obstructed by items or other individuals in the cabin of the vehicle. External video sources may be connected to the vehicle's controller system via out of band connections such as Wi-Fi (Wireless Fidelity), BLE (Bluetooth® Low Energy), UWB (Ultra-Wideband), or other types of wired or wireless technologies.

Video feed 206 may be a composite video feed that includes video from multiple sources such as some or all of camera feed 202-A, camera feed 202-B, camera feed 202-C, and/or camera feed 202-D. Video feed 206 may provide images to network 208, for example to a video conference platform that provides the video feed 206 to participants 210 of a video conference call.

Video feed may be transmitted over a communications network 208 using a transmission medium via a network interface device/transceiver utilizing any one of a number of transfer protocols (e.g., frame relay, internet protocol (IP), transmission control protocol (TCP), user datagram protocol (UDP), hypertext transfer protocol (HTTP), etc.). In an example, the network interface device/transceiver may include one or more antennas to connect to the communications network. In an example, the network interface device/transceiver may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine and includes digital or analog communications signals or other intangible media to facilitate communication of such software.

In various embodiments, the vehicle connects to a conference call (e.g., via network 208 with participants 210) by extracting a meeting link, which may be a HTTP-based link, a meeting ID, password, dial-in number, or other means for specifying a meeting environment. The vehicle's controller system may run a script to open a web browser and visit a URL for a conference call and run a script that joins the call (e.g., using a user account associated with one of the participants in the vehicle or a user account associated with the vehicle) by simulating clicking of buttons, clicking of a cursor, pressing of keys, etc. A script may be run to open joining the meeting and extracting frames or a live video stream of the call and presenting it to a display screen of the vehicle, for example, on a human-machine interface (HMI) or center console of the vehicle. Audio for the call may be played on speakers of the vehicle, connected devices (e.g., smartphone connected to vehicle via Bluetooth®) and so forth. In various embodiments, audio for a conference call is multiplexed and processed according to techniques described in connection with FIG. 3 below.

In various embodiments, an HMI or other display of the vehicle presents information to the occupants of the vehicle regarding the time remaining to the destination. For example, if a conference call is ongoing, or is scheduled to last beyond the estimated arrival time to the vehicle's destination, a timer may be displayed to indicate the time remaining to the destination and warn the driver to notify participants when the vehicle is approaching the destination. In some embodiments, the vehicle will provide the ability to transfer the conference call line to one or more connected devices (e.g., smartphones or tablets) so that the attendee(s) of the conference call can continue to participate in the conference call when the vehicle arrives at the destination.

Figure 3:
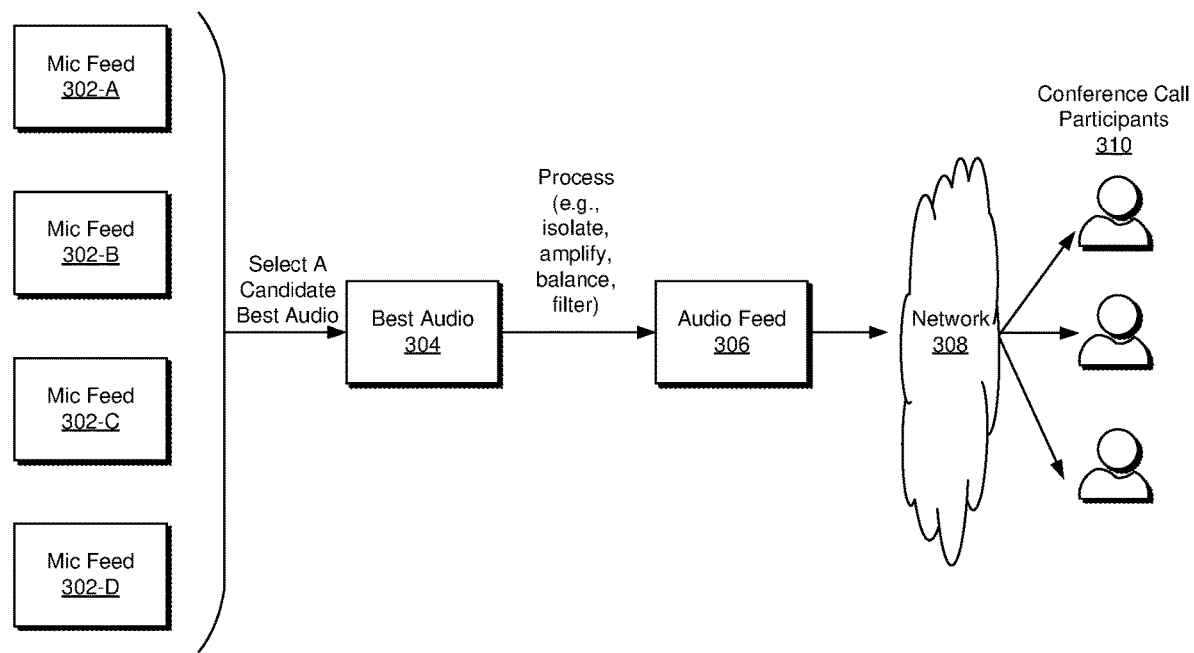
FIG. 3 illustrates a diagram depicting an example of in-vehicle audio processing with user tracking and speaker prioritization, according to at least one embodiment of the present disclosure.

FIG. 3 illustrates a diagram 300 depicting an example of in-vehicle video processing with user tracking and speaker prioritization, according to at least one embodiment of the present disclosure.

In at least one embodiment, FIG. 3 is implemented in the context of a vehicle cabin that comprises multiple microphones. For example, a first microphone may be used to provide mic feed 302-A, a camera microphone may be used to provide mic feed 302-B, a third microphone may be used to provide mic feed 302-C, a camera microphone may be used to provide mic feed 302-D, and so on and so forth. In various embodiments, the microphone feeds are candidate sources for best audio 304. The candidate audio sources may include other audio sources, such as audio from connected devices in the vehicle cabin, such as a smartphone paired to the vehicle's controller system via Bluetooth®.

Best audio 304 may be selected from a plurality of candidate best audio sources. As discussed above, each microphone in a vehicle can serve as a candidate best audio source. In some embodiments, the best audio 304 is selected based on a ranking of sound quality and the first ranked, second ranked, etc. candidate best audio source may be selected, based on various factors such as audio quality, bit rate, and so on and so forth.

In various embodiments, best audio 304 is selected from the plurality of candidate best audio sources (e.g., from one of the mic feeds 302-A thru 302-D or other sources) and is processed. In some embodiments, the vehicle's controller system will isolate, amplify, balance, bandpass filter, or noise cancel the audio of background noise to produce the audio feed 306.

In some embodiments, best audio 304 is selected based at least in part by processing video feed information. For example, video feed information may be analyzed to detect mouth movements or gestures that can be used to select occupants that are likely to be speaking.

In various embodiments, best audio 304 is processed to produce audio feed 306. In some embodiments, the microphone of non-speakers is muted to reduce the amount of background noise that is captured in the vehicle. In some embodiments, unrecognized voices are muted. If there are multiple cabin microphones, the microphone nearest to a speaker not on the call or determined to not be authorized for the call may be muted. In some embodiments, techniques—such as machine learning—can be used to determine the identity of a speaker in the vehicle. If the speaker is not included in a list of attendees for a video conference, the microphone nearest to that speaker may be muted. This may be helpful in cases, for example, where an adult is participating on a conference call from his or her vehicle but has a child in the vehicle as well that is not authorized to participate in the call.

In various embodiments, two or more speakers will be simultaneously speaking, in which case their respective images may be presented in a two-box image. The respective audio for the multiple speakers may be captured by one microphone, or by the microphones closest to the respective speakers. In such cases, best audio 304 may include mic feeds from the closest microphone to each speaker, and may be processed to create a composite audio feed, for example, by at least equalizing the volume of the multiple speakers and combining them to a composite audio feed. The composite audio feed may be provided as the audio feed 306 that is transmitted to the remote participants 310 of the conference call.

In various embodiments, video and/or audio from connected devices in the cabin of the vehicle can be patched in as part of the audio feed 306. In various embodiments, audio from a smartphone in the cabin could be used as a candidate audio source. This external audio source may be preferable to using onboard microphones in the case where the speaker is distant from the nearest microphone. External audio sources may be connected to the vehicle's controller system via out of band connections such as Wi-Fi, BLE, UWB, or other types of wired or wireless technologies. Further, latency compensation may be used to adjust audio from mobile devices if the audio is delivered via a cellular connection versus a direct path RF connection.

Audio feed 306 may be a composite audio feed that includes audio from multiple sources such as some or all of mic feed 302-A, mic feed 302-B, mic feed 302-C, and/or mic feed 302-D. Audio feed 306 may provide audio packets to network 308, for example to a video conference platform that provides the audio feed 306 to participants 310 of a video conference call. In various embodiments, video for a conference call is multiplexed and processed according to techniques described in connection with FIG. 2 above. In various embodiments, the same network is used to provide both audio and video to a video conferencing platform. In other embodiments, audio and video may be provided using separate communications channel—for example, a smartphone may use a data connection (e.g., Wi-Fi) to provide video and a telephone call to a conference number to provide audio.

Audio feed 306 may be transmitted over a communications network 308 using a transmission medium via a network interface device/transceiver utilizing any one of a number of transfer protocols (e.g., frame relay, internet protocol (IP), transmission control protocol (TCP), user datagram protocol (UDP), hypertext transfer protocol (HTTP), etc.). In an example, the network interface device/transceiver may include one or more antennas to connect to the communications network. In an example, the network interface device/transceiver may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine and includes digital or analog communications signals or other intangible media to facilitate communication of such software.

In some embodiments, the speaker's identity is determined and used to provide metadata to the other participants 310 of the conference call. For example, when the vehicle connects to the conference call, it may have a display name that identifies the participant as "Joe's sedan", which will be sent to and seen as the display name by the other participants 310 on the call. Continuing with this example, when a first occupant of the car begins speaking, the name of the speaker may be identified (e.g., using voice recognition technology) and used to update the display name. An updated display name may be sent to the other participants 310 and they may see additional information regarding the speaker as the display name, for example: "Joe's sedan (Kelly speaking)". If another occupant of the vehicle then speaks, the display name may change to the other speaker's name, for example: "Joe's sedan (Lance speaking)". In this way, the overall conference call experience of other participants 310 is improved. In some embodiments, the speaker's avatar or a zoomed in or cropped version of a camera feed provides a view on the speaker. In this way, the other participants 310 of the video conference call have an improved experience as they are able to more clearly identify which among several occupants of a vehicle is speaking in the conference call at any given moment.

Figure 4:
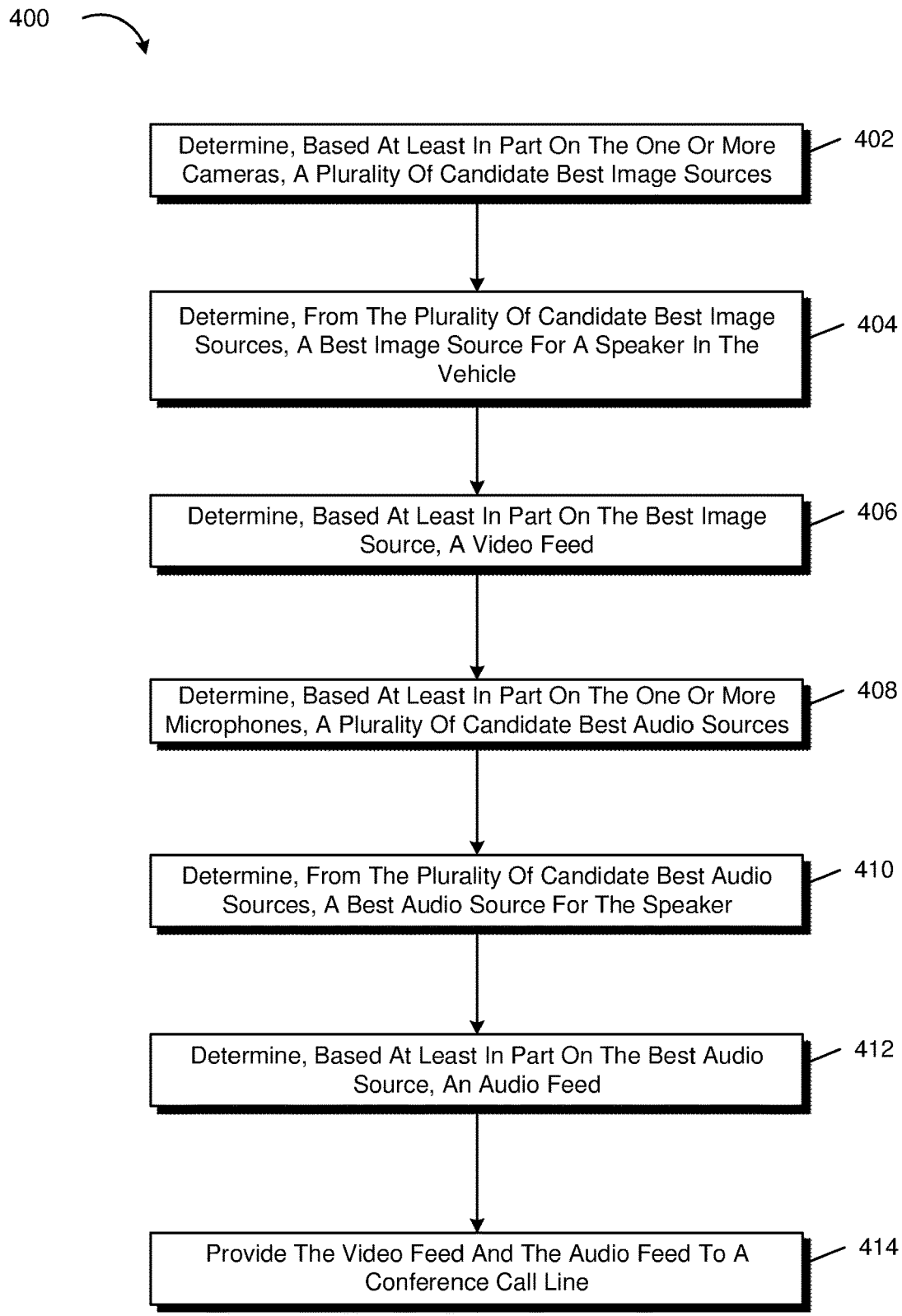
FIG. 4 shows an illustrative example of a process for smart in-vehicle conferencing with user tracking and speaker prioritization, in accordance with one or more example embodiments of the present disclosure.

FIG. 4 shows an illustrative example of a process 400 for smart in-vehicle conferencing with user tracking and speaker prioritization, in accordance with one or more example embodiments of the present disclosure. In at least one embodiment, some or all of the process 400 (or any other processes described herein, or variations and/or combinations thereof) is performed under the control of one or more computer systems that store computer-executable instructions and may be implemented as code (e.g., computer-executable instructions, one or more computer programs, or one or more applications) executing collectively on one or more processors, by hardware, software, or combinations thereof. The code, in at least one embodiment, is stored on a computer-readable storage medium in the form of a computer program storing a plurality of computer-readable instructions executable by one or more processors. The computer-readable storage medium, in at least one embodiment, is a non-transitory computer-readable medium. In at least one embodiment, at least some of the computer-readable instructions usable to perform the process 400 are not stored solely using transitory signals (e.g., a propagating transient electric or electromagnetic transmission). A non-transitory computer-readable medium does not necessarily include non-transitory data storage circuitry (e.g., buffers, caches, and queues) within transceivers of transitory signals. Process 400 may be implemented in the context of various systems and methods described elsewhere in this disclosure, such as those discussed in connection with FIGS. 1-3. In at least one embodiment, process 400 or a portion thereof is collectively implemented by a controller system of a vehicle. In various embodiments, a vehicle controller is utilized to perform some or all of the steps of process 400 and/or steps of other processes described throughout this disclosure.

In various embodiments, process 400 starts at the top of FIG. 4 and begins with step 402 where the system (e.g., vehicle's controller system) performing process 400 will determine, based at least in part on one or more cameras within a cabin of a vehicle, a plurality of candidate best image sources. For example, cameras may be located throughout the vehicle's cabin. In some embodiments, the vehicle has a camera located in the front of the vehicle that is situated ideally for use to capture video of occupants in a front row of the vehicle and has another camera situated ideally for use to capture video of occupants in a second row or third row of the vehicle.

More generally, the vehicle cabin described in the context of process 400 is a non-limiting example of a type of an enclosed space in which the techniques described herein may be practiced. Techniques described herein in connection with FIGS. 1-4 may be applicable to a wide variety of enclosed spaces, such as a conference room, airplane, train, or other automotive settings. Other automotive settings may include shuttles, taxi, or buses, including driverless autonomous vehicles with seats facing each other, all facing one direction (forward or rear), facing left or right, or a combination of seating orientations.

In various embodiments, process 400 comprises a step 404 to select or otherwise determine, from the plurality of candidate best image sources, a best image source for a speaker in the vehicle. In some embodiments, the best image is selected from a secondary image source and uses a file photo or avatar of an occupant who might be in the outboard seats and not in the view of any of the cameras in the vehicle or may be partially occluded. The conference call (CC) image may be one of a character or cartoon they pick from a roster of pre-recorded image files. In some embodiments, a speaker is occluded but their identity is known, for example, based on the speaker's voice or from prior visual imagery. A virtual avatar—for example, a photorealistic emoji or cartoon character, may be generated based at least in part on the audio to lip-sync the words that are being recorded, rather than providing a partially occluded or low resolution view of the speaker.

In various embodiments, process 400 comprises a step 406 to determine, based at least in part on the best image source, a video feed. In some embodiments, the best image will receive a video feed from the best candidate image source and perform cropping, stitching, or substituting an archived or virtual image of a known speaker thus providing an improved user experience for all participants. For example, in some embodiments, the best candidate image source is an avatar of the speaker. In some embodiments, the virtual avatar of a speaker will be presented as the best image. The virtual avatar may be a static image, or may be an animated virtual avatar that will have lip sync animation that mimics the speech that is detected from an on-board microphone.

In various embodiments, process 400 comprises a step 408 to determine, based at least in part on the one or more microphones, a plurality of candidate best audio sources. The plurality of candidate best audio sources may include one candidate best audio source per microphone. In some embodiments, as additional candidate best audio sources may include other devices such as smartphones in the cabin of the vehicle that are connected to the vehicle's controller system, for example, via a Bluetooth®, UWB, or Wi-Fi connection.

In various embodiments, process 400 comprises a step 410 to determine, from the plurality of candidate best audio sources, a best audio source for the speaker. The best audio source may be determined based on video information. For example, facial detection technology may be used to determine when an occupant of the vehicle is speaking, and the nearest microphone to the speaker may be selected as the best audio source.

In various embodiments, process 400 comprises a step 412 to determine, based at least in part on the best audio source, an audio feed. In various embodiments, audio from the best audio source is processed to produce the audio feed. In some embodiments, the vehicle's controller system will isolate, amplify, balance, bandpass filter, or noise cancel the audio of background noise to produce the audio feed.

In various embodiments, two or more speakers will be simultaneously speaking, in which case their respective images may be presented in a two-box image. The respective audio for the multiple speakers may be captured by one microphone, or by the microphones closest to the respective speakers. In such cases, best audio may include mic feeds from the closest microphone to each speaker, and may be processed to create a composite audio feed, for example, by at least equalizing the volume of the multiple speakers and combining them to a composite audio feed. The composite audio feed may be provided as the audio feed that is transmitted to the remote participants of the conference call.

In various embodiments, process 400 comprises a step 414 to provide, to a conference call line, the video feed and the audio feed of the conference call platform, which may receive a continuous stream of video and/or audio content from the system performing process 400. For example, even when a second speaker participates in the conference call and the best image and/or best audio source shifts to a camera and/or microphone nearest to the second speaker, it will appear as a seamless video and audio feed to the other remote participants of the conference call.

In various embodiments, the best image is selected based on audio information. For example, a microphone may be used to detect a speaker in the vehicle and the camera nearest to the audio may be selected as the best image. In various embodiments, microphones located at different areas in the vehicle cabin may capture audio and may use triangulation to determine the location of the speaker. The location of the speaker may be used to select a candidate video source as the best image.

In various embodiments, to improve the conference call experience for those not within the vehicle, the best image (closest camera or a cropped view or an archived view) of the speaker will be selected along with the best audio capture of the speaker (e.g., nearest microphone or a processed/filtered audio of the available microphone audio). The best video and best audio signals will be injected into the single conference call line and, as different participants in the cabin speak, the best video and best audio of the person speaking will be isolated and injected into the call line.

In various embodiments, the controller system of the vehicle collects video feeds from all of the cabin cameras to decide which have the best video stream of the speaker or speakers, and then the vehicle will consolidate these feeds into one outgoing video stream that is sent as a seamless video feed to the remote conference call participants.

If there are multiple cabin microphones, a microphone nearest a speaker clearly not on the call or determined to not be authorized for the call may be muted provided all authorized participants trained their voice. It may also be possible to mute an unrecognized voice from a one microphone system but more difficult.

In various embodiments, the system may opt to not use camera feeds for people that are not authorized to be on the call or not actively speaking by not selecting that camera. If a person cannot be removed from a camera field the system may crop to just the face of the person(s) speaking and/or pixelate the faces of those not speaking.

In various embodiments, microphones and/or cameras can be used to detect whether a participant has dozed off, and the system could buzz their headrest (while muting their local microphone) to discreetly to wake them.

In various embodiments, the best image and/or audio may be selected from an external video or audio source. For example, video and audio from a second or third phone may be piped into the cabin for sending/receiving out a different phone (e.g., the main conference phone). For example, this would allow third row participants to be heard and seen better. This may allow for better audio and noise cancelation for the whole system. The third row user's phones audio could be tied in as a supplementary microphone through settings using an out of band connection (BLE, Wi-Fi, UWB, etc.), allowing for single call connectivity and management (no unmanaged open microphones).

In various embodiments, process 400 comprises using a facial recognition engine in the vehicle to align the user's face with the camera (e.g., so they appear to be looking at the camera, instead of being viewed from above or from some off angle). The system could determine the angle of the user's face with respect to the camera and correct the image to be looking at the camera given they are outside of a threshold.

Figure 5:
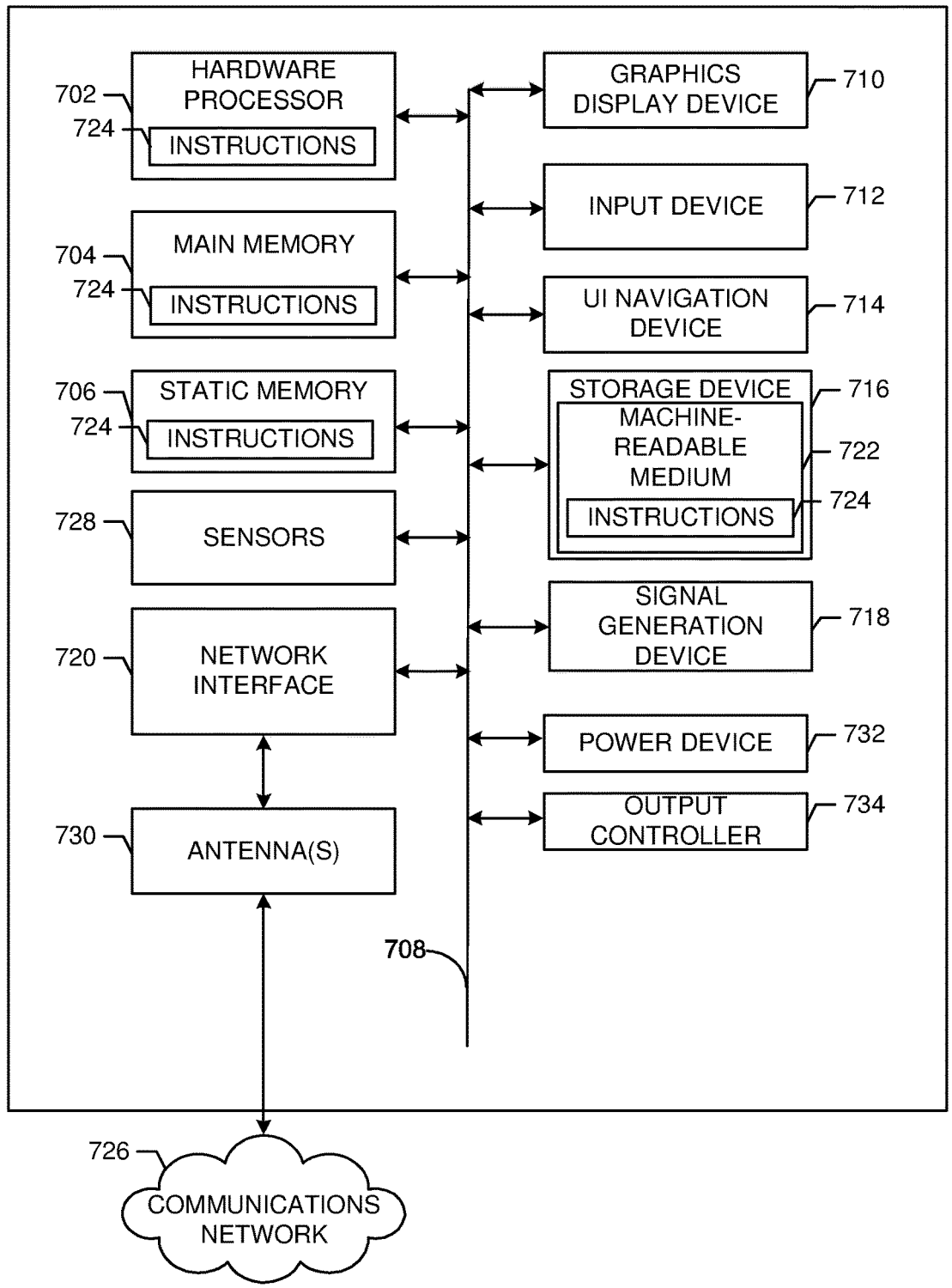
FIG. 5 illustrates a block diagram of an example of a machine or system upon which any one or more of the techniques (e.g., methodologies) discussed herein may be performed.

FIG. 5 illustrates a block diagram of an example of a machine 500 or system upon which any one or more of the techniques (e.g., methodologies) discussed herein may be performed. The machine (e.g., computer system) 500 may include any combination of the illustrated components. For example, the machine 500 may include a hardware processor 502 (e.g., a central processing unit (CPU), a graphics processing unit (GPU), a tensor processing unit (TPU) including an artificial intelligence application-specific integrated circuit (ASIC), a hardware processor core, or any combination thereof), a main memory 504 and a static memory 506, some or all of which may communicate with each other via an interlink (e.g., bus) 508. The machine 500 may further include a power management device 532, a graphics display device 510, an alphanumeric input device 512 (e.g., a keyboard), and a user interface (UI) navigation device 514 (e.g., a mouse). In an example, the graphics display device 510, alphanumeric input device 512, and UI navigation device 514 may be a touch screen display. The machine 500 may additionally include a storage device (i.e., drive unit) 516, a signal generation device 518 (e.g., a data signal), a network interface device/transceiver 520 coupled to antenna(s) 530, and one or more sensors 528, such as a sound detecting sensor (e.g., a microphone), accelerometers, magnetometers, location sensors, and the like. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, other sensors, etc.)).

The storage device 516 may include a machine readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media. In various embodiments, a vehicle's controller system is implemented using one or more machines (e.g., machine 500).

While the machine-readable medium 522 is illustrated as a single medium, the term "machine-readable medium" may include a single medium or multiple media (e.g., a centralized or distributed database, and/or associated caches and servers) configured to store the one or more instructions 524.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface device/transceiver 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include DOCSIS, fiber optic, a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 520 may include one or more physical jacks (e.g., Ethernet, coaxial, or phone jacks) or one or more antennas to connect to the communications network 526. In an example, the network interface device/transceiver 520 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cable box, a wearable smart device, cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a wearable smart device, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, DOCSIS, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Implementations of the systems, apparatuses, devices, and methods disclosed herein may comprise or utilize a special purpose or general-purpose computer including computer hardware, such as, for example, one or more processors and system memory, as discussed herein. Computer-executable instructions comprise, for example, instructions and data which, when executed at a processor, cause a general-purpose computer, special purpose computer, or special purpose processing device to perform a certain function or group of functions. An implementation of the devices, systems and methods disclosed herein may communicate over a computer network. A "network" is defined as one or more data links that enable the transport of electronic data between computer systems and/or modules and/or other electronic devices.

Although the subject matter has been described in language specific to structural features and/or methodological acts, it is to be understood that the subject matter defined in the appended claims may not necessarily be limited to the described features or acts described above. Rather, the described features and acts are disclosed as example forms of implementing the claims.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described exemplary embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A vehicle, comprising:
one or more cameras;
one or more microphones; and
a controller system, further comprising one or more processors and memory storing executable instructions that, as a result of execution by the one or more processors, causes the controller system to:
   determine, based at least in part on the one or more cameras, a plurality of candidate best image sources;
   determine, from the plurality of candidate best image sources, a best image source for a speaker in the vehicle;
   determine, based at least in part on the best image source, a video feed;
   cropping or otherwise modifying the video feed to remove one or more occupants other than the speaker of the vehicle from the video feed;
   determine, based at least in part on the one or more microphones, a plurality of candidate best audio sources;
   determine, from the plurality of candidate best audio sources, a best audio source for the speaker;
   determine, based at least in part on the best audio source, an audio feed; and
   provide, to a conference call line, the video feed and the audio feed.

2. The vehicle of claim 1, wherein the executable instructions include further instructions that, as a result of execution by the one or more processors, further causes the controller system to:
   process the best image source to produce the video feed, wherein the best image source is processed by at least:
      performing localization of the speaker in the vehicle; and
      determining a region of one or more images of the best image source that is associated with the speaker.

3. The vehicle of claim 2, wherein the localization of the speaker is based at least in part on audio information collected by the one or more microphones to determine where the speaker is.

4. The vehicle of claim 1, wherein the executable instructions include further instructions that, as a result of execution by the one or more processors, further causes the controller system to:
   determine that the speaker is obstructed from view of the one or more cameras; and
   select, as the best image source, a virtual avatar for the speaker.

5. The vehicle of claim 1, wherein the executable instructions include further instructions that, as a result of execution by the one or more processors, further causes the controller system to:
   determine an identity of the speaker;
   determine a display name based on the identity; and
   provide, to the conference call line, the display name.

6. The vehicle of claim 1, wherein the executable instructions include further instructions that, as a result of execution by the one or more processors, further causes the controller system to:
   determine a second speaker;
   determine, from the plurality of candidate best image sources, a second best image source for the second speaker, wherein the second best image source is different from the best image source; and
   use the second best image source in place of the best image source for the video feed.

7. The vehicle of claim 6, wherein the plurality of candidate best audio sources comprises one or more external devices in the vehicle that is connected to the controller system, wherein the one or more external devices include one or more mobile devices.

8. A non-transitory computer-readable storage medium storing executable instructions that, as a result of being executed by one or more processors of a controller system of a vehicle, cause the controller system to at least:
   determine, based at least in part on one or more cameras in a cabin of the vehicle, a plurality of candidate best image sources;
   determine, from the plurality of candidate best image sources, a best image source for a speaker in the vehicle;
   determine, based at least in part on the best image source, a video feed;
   crop or otherwise modify the video feed to remove one or more occupants other than the speaker of the vehicle from the video feed;
   determine, based at least in part on one or more microphones in the cabin of the vehicle, a plurality of candidate best audio sources;
   determine, from the plurality of candidate best audio sources, a best audio source for the speaker;
   determine, based at least in part on the best audio source, an audio feed; and
   provide, to a conference call line, the video feed and the audio feed.

9. The non-transitory computer-readable storage medium of claim 8, wherein the executable instructions, as a result of execution by the one or more processors, further causes the controller system to:
   process the best image source to produce the video feed, wherein the best image source is processed by at least:
      performing localization of the speaker in the vehicle; and
      determining a region of one or more images of the best image source that is associated with the speaker.

10. The non-transitory computer-readable storage medium of claim 9, wherein the localization of the speaker is based at least in part on audio information collected by the one or more microphones to determine where the speaker is.

11. The non-transitory computer-readable storage medium of claim 8, wherein the executable instructions, as a result of execution by the one or more processors, further causes the controller system to:
   determine that the speaker is obstructed from view of the one or more cameras; and
   select, as the best image source, a virtual avatar for the speaker.

12. The non-transitory computer-readable storage medium of claim 8, wherein the executable instructions, as a result of execution by the one or more processors, further causes the controller system to:
   determine an identity of the speaker;
   determine a display name based on the identity; and
   provide, to the conference call line, the display name.

13. The non-transitory computer-readable storage medium of claim 8, wherein the executable instructions, as a result of execution by the one or more processors, further causes the controller system to:

determine a second speaker;

determine, from the plurality of candidate best image sources, a second best image source for the second speaker, wherein the second best image source is different from the best image source; and use the second best image source in place of the best image source for the video feed.

14. A method, comprising:

determining, by one or more processors, based at least in part on one or more cameras of an enclosed space, a plurality of candidate best image sources;

determining, by the one or more processors, from the plurality of candidate best image sources, a best image source for a speaker in the enclosed space;

determining, by the one or more processors, based at least in part on the best image source, a video feed;

crop or otherwise modify, by the one or more processors, the video feed to remove one or more occupants other than the speaker from the video feed;

determining, by the one or more processors, based at least in part on one or more microphones in the enclosed space, a plurality of candidate best audio sources;

determining, by the one or more processors, from the plurality of candidate best audio sources, a best audio source for the speaker;

determining, by the one or more processors, based at least in part on the best audio source, an audio feed; and providing, by the one or more processors, to a conference call line, the video feed and the audio feed.

15. The method of claim 14, further comprising:

processing, by the one or more processors, the best image source to produce the video feed, wherein the best image source is processed by at least:

performing localization of a speaker in the enclosed space; and determining a region of one or more images of the best image source that is associated with the speaker.

16. The method of claim 15, wherein the localization of the speaker is based at least in part on audio information collected by the one or more microphones to determine where the speaker is.

17. The method of claim 14, further comprising:

determining, by the one or more processors, that the speaker is obstructed from view of the one or more cameras; and selecting, by the one or more processors, as the best image source, a virtual avatar for the speaker.

18. The method of claim 14, further comprising:

determining, by the one or more processors, an identity of the speaker;

determining, by the one or more processors, a display name based on the identity; and providing, by the one or more processors, to the conference call line, the display name.

19. The method of claim 18, further comprising:

determining, by the one or more processors, a second speaker;

determining, by the one or more processors, from the plurality of candidate best image sources, a second best image source for the second speaker, wherein the second best image source is different from the best image source; and using, by the one or more processors, the second best image source in place of the best image source for the video feed.

20. The method of claim 14, wherein the plurality of candidate best audio sources comprises one or more smartphone devices in the enclosed space.

* * * * *